United States Patent
Choi et al.

(10) Patent No.: US 10,178,529 B2
(45) Date of Patent: Jan. 8, 2019

(54) METHOD OF RETRANSMITTING DATA IN A WIRELESS CONNECTION SYSTEM SUPPORTING MACHINE-TO-MACHINE COMMUNICATION, AND DEVICE FOR SUPPORTING SAME

(71) Applicant: LG ELECTRONICS INC., Seoul (KR)

(72) Inventors: Jinsoo Choi, Anyang-si (KR); Hangyu Cho, Anyang-si (KR); Dongcheol Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 811 days.

(21) Appl. No.: 14/351,843

(22) PCT Filed: Oct. 15, 2012

(86) PCT No.: PCT/KR2012/008375
§ 371 (c)(1),
(2) Date: Apr. 14, 2014

(87) PCT Pub. No.: WO2013/055175
PCT Pub. Date: Apr. 18, 2013

(65) Prior Publication Data
US 2014/0362795 A1 Dec. 11, 2014

Related U.S. Application Data

(60) Provisional application No. 61/547,047, filed on Oct. 14, 2011.

(51) Int. Cl.
*H04W 72/10* (2009.01)
*H04W 4/70* (2018.01)
(Continued)

(52) U.S. Cl.
CPC ............. *H04W 4/70* (2018.02); *H04L 1/1887* (2013.01); *H04W 72/10* (2013.01);
(Continued)

(58) Field of Classification Search
CPC ....................................................... H04W 4/005
(Continued)

(56) References Cited

U.S. PATENT DOCUMENTS 5,838,668 A * 11/1998 Okada ................ H04B 7/18523
370/312
6,674,765 B1 * 1/2004 Chuah ............... H04W 74/0875
370/252

(Continued)

FOREIGN PATENT DOCUMENTS

EP 2066064 6/2009
KR 10-2002-0081529 10/2002
(Continued)

OTHER PUBLICATIONS

PCT International Application No. PCT/KR2012/008375, Written Opinion of the International Searching Authority dated Mar. 29, 2013, 18 pages.

*Primary Examiner* — Brandon Renner
*Assistant Examiner* — Abdeltif Ajid
(74) *Attorney, Agent, or Firm* — Lee, Hong, Degerman, Kang & Waimey

(57) ABSTRACT

The present invention relates to a wireless connection system, and in particular, relates to methods of retransmitting data in a machine-to-machine communication system, methods of managing the data, and devices for supporting machine-to-machine communication. As one aspect of the present invention, the method of retransmitting data in the wireless connection system supporting the machine-to-machine communication may include: allocating a data slot for (Continued)

retransmitting data from a first machine, from among two or more peer machines, by transmitting a transmit request message to a second machine; receiving a transmit response message transmitted form the second machine in response to the transmit request message; and retransmitting data to the second machine through the allocated data slot.

10 Claims, 13 Drawing Sheets

(51) Int. Cl.
  *H04L 1/18* (2006.01)
  *H04W 76/14* (2018.01)
  *H04W 72/04* (2009.01)
  *H04L 1/16* (2006.01)
  *H04W 74/08* (2009.01)
(52) U.S. Cl.
  CPC ....... *H04L 1/1671* (2013.01); *H04W 72/0446* (2013.01); *H04W 74/08* (2013.01); *H04W 76/14* (2018.02)
(58) Field of Classification Search
  USPC .......................................... 370/329
  See application file for complete search history.

(56) References Cited

U.S. PATENT DOCUMENTS

| | | | |
|---|---|---|---|
| 8,370,552 B2* | 2/2013 | Mittal | G06F 13/366 710/112 |
| 2006/0072530 A1* | 4/2006 | Strutt | H04W 99/00 370/338 |
| 2006/0194538 A1* | 8/2006 | Palin | H04L 1/1887 455/41.2 |
| 2009/0005057 A1* | 1/2009 | Lee | H04W 16/14 455/450 |
| 2009/0016229 A1* | 1/2009 | Wu | H04L 12/1881 370/252 |
| 2009/0016295 A1* | 1/2009 | Li | H04L 5/0007 370/330 |
| 2013/0059614 A1* | 3/2013 | Kannan | H04W 72/06 455/500 |

FOREIGN PATENT DOCUMENTS

| | | |
|---|---|---|
| KR | 10-2009-0092708 | 9/2009 |
| KR | 10-2010-0038440 | 4/2010 |

\* cited by examiner

METHOD OF RETRANSMITTING DATA IN A WIRELESS CONNECTION SYSTEM SUPPORTING MACHINE-TO-MACHINE COMMUNICATION, AND DEVICE FOR SUPPORTING SAME

CROSS-REFERENCE TO RELATED APPLICATIONS

This application is the National Stage filing under 35 U.S.C. 371 of International Application No. PCT/KR2012/008375, filed on Oct. 15, 2012, which claims the benefit of U.S. Provisional Application Ser. No. 61/547,047, filed on Oct. 14, 2011, the contents of which are all hereby incorporated by reference herein in their entirety.

TECHNICAL FIELD

The present invention relates to a wireless access system, and more particularly, to methods for retransmitting data in a Machine-to-Machine (M2) communication system, methods for managing the data, and apparatuses for supporting the same.

BACKGROUND ART

An M2M communication environment according to the present invention will be described below in brief.

As its appellation implies, Peer-to-Peer (P2P) communication as an example of M2M communication refers to communication between electronic devices. In a broad sense of the term, P2P communication means wired or wireless communication between electronic devices or communication between a human-controlled device and a machine. Recently, P2P communication typically means wireless communication between electronic devices without human intervention.

In the early 1990s when the concept of P2P communication was introduced, P2P communication was regarded merely as remote control or telematics and its market was very limited. However, the past few years have witnessed the rapid development of P2P communication and thus its market has been boosted so much as to attract worldwide interest. Particularly, P2P communication has significantly affected fleet management in Point Of Sales (POS) and security-related application markets, remote monitoring of machines and facilities, operation time measurement of construction machines, and smart metering of automatically measuring heat or electricity consumption. P2P communication will find its applications for various usages in conjunction with legacy mobile communication, ultra-high speed wireless Internet, or low-power communication solutions such as Wireless Fidelity (Wi-Fi) and Zigbee. Therefore, M2M communication will expand its market to a Business to Consumer (B2C) market beyond a Business to Business (B2B) market.

The term P2P is interchangeably used with Device to Device (D2D), M2M, etc.

DISCLOSURE

Technical Problem

In P2P communication without a centralized controller, data transmission is performed according to a frame structure based on specific time slots. However, compared to a retransmission method in which a base station determines an ACKnowledgment/Negative-ACKnowledgment (ACK/NACK) in regards to transmitted data and instructs retransmission as in a legacy cellular system, it is difficult to reschedule P2P retransmission in a situation where a centralized controller for controlling retransmission does not exist.

For example, if a specific transmitting device arbitrarily retransmits data to a specific receiving device in response to a NACK signal received from the specific receiving device, the data retransmission may affect data transmission of other peer devices. Particularly, if the data retransmission affects a P2P communication link having priority over the P2P communication link of the data retransmission, the problem may become serious. Accordingly, there is a need for a method for solving the problem.

An object of the present invention devised to solve the problem lies on an efficient P2P retransmission method.

Another object of the present invention devised to solve the problem lies on a method for, when resources are allocated for retransmission on a specific P2P communication link, preventing collision between the specific P2P communication link and another P2P communication link.

Another object of the present invention devised to solve the problem lies on a method for overcoming a scheduling problem encountered when retransmission on a specific P2P communication link affects a P2P communication link having priority level over the specific P2P communication link.

Another object of the present invention devised to solve the problem lies on a method for allocating retransmission resources, which is applicable to both a scenario with a centralized controller or a central unit and a scenario without a centralized controller or a central unit.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the above technical objects, the present invention relates to a wireless access system, and more particularly, to methods for retransmitting data in an M2M communication system, methods for managing the data, and apparatuses for supporting the same.

The object of the present invention can be achieved by providing a method for retransmitting data in a wireless access system supporting Machine to Machine (M2M) communication. The method includes transmitting a transmission request message to a second device by a first device among two or more peer devices, to allocate a data slot for a data retransmission, receiving a transmission response message in response to the transmission request message from the second device, and retransmitting data in an allocated data slot to the second device.

In another aspect of the present invention, provided herein is a first device for retransmitting data in a wireless access system supporting M2M communication. The first device includes a Radio Frequency (RF) module, and a processor for controlling data retransmission.

The processor transmits a transmission request message to a second device among two or more peer devices through the RF module, to allocate a data slot for a data retransmission, receives a transmission response message in response to the transmission request message from the second device through the RF module, and controls the RF module to retransmit data in an allocated data slot to the second device.

In the aspects of the present invention, data slots for data transmission may be allocated to the two or more peer devices according to priority levels of the two or more peer devices.

The data slot for the data retransmission may be allocated based on a priority level of the first device.

The data slot may be one of the data slots already allocated to the two or more peer devices.

The transmission request message may be transmitted in every data slot, to allocate resources for data transmission.

Or the transmission request message may be transmitted on a predetermined peer device group basis, to allocate resources for data transmission.

Or the transmission request message may be transmitted to allocate resources for data transmission to all of the two or more peer devices.

The afore-described aspects of the present invention are merely a part of preferred embodiments of the present invention. Those skilled in the art will derive and understand various embodiments reflecting the technical features of the present invention from the following detailed description of the present invention.

Advantageous Effects

Embodiments of the present invention have the following effects.

First, when peer devices conduct P2P communication in a P2P network, the peer devices can efficiently retransmit data.

Secondly, when resources are allocated for retransmission on a specific P2P communication link, a data slot is reallocated according to the priority level of the specific P2P communication link. Therefore, collision between the specific P2P communication link and another P2P communication link can be avoided.

Thirdly, even when retransmission on a specific P2P communication link affects a P2P communication link having priority over the specific P2P communication link, a scheduling encountered with allocation of a data slot for retransmission can be solved.

Fourthly, the embodiments of the present invention can be applied to both a scenario with a centralized controller or a central unit and a scenario without a centralized controller or a central unit.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
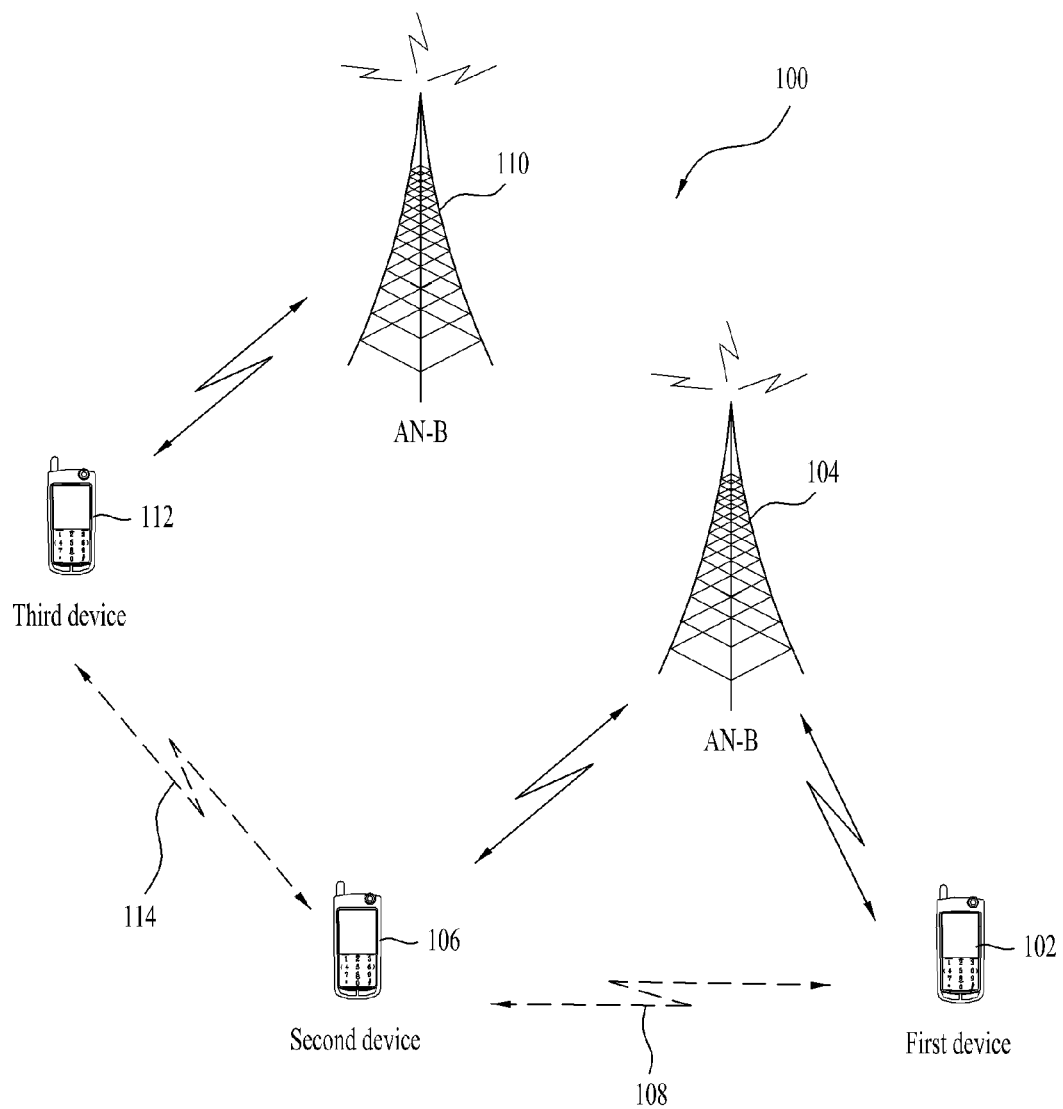
FIG. 1 illustrates an exemplary Peer-to-Peer (P2P) network used in an ad-hoc communication system in relation to a Wide Area Network (WAN)

Embodiments of the present invention described below provide various methods for retransmitting data, methods for managing the data, and apparatuses for supporting the same in a wireless access system supporting Machine-to-Machine (M2M) communication.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description has been mainly made of a data transmission and reception relationship between peer devices. However, the embodiments of the present invention are also applicable to a data transmission and reception relationship between a peer device and a Base Station (BS) (e.g., an Access Node (AN)).

Herein, a BS refers to a terminal node of a network, which directly communicates with a User Equipment (UE). A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an Advanced Base Station (ABS), an AN, an Access Point (AP), etc. In addition, the term BS used in a cellular system may be called a centralized controller or a central unit in a Peer-to-Peer (P2P) system.

The term peer device may be replaced with a Mobile Station (MS), a UE, a Subscriber Station (SS), a Mobile Subscriber Station (MSS), a mobile terminal, an Advanced Mobile Station (AMS), a terminal, etc. Particularly, the terms peer device, Device-to-Device (D2D) device, and M2M device are interchangeable in the present invention.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on UpLink (UL). Likewise, the UE may serve as a receiver and the BS may serve as a transmitter, on DownLink (DL).

The embodiments of the present invention may be supported by standard documents disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, a 3GPP LTE-Advanced (LTE-A) system, and a 3GPP2 system. That is, the steps or parts, which are not described to clearly reveal the technical idea of the present invention, in the embodiments of the present invention may be explained by the above documents.

All terms used in the embodiments of the present invention may be explained by the standard documents. Particularly, the embodiments of the present invention may be supported by at least one of IEEE 802.16 specifications, that is, p802.16e-2004, P802.16e-2005, P802.16m, P802.16p, and P802.16.1b documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. Those of ordinary skilled in the art will recognize that various changes and modifications of the embodiments described herein can be made without departing from the scope and spirit of the disclosure. In addition, descriptions of well-known functions and constructions may be omitted for clarity and conciseness. Like reference numerals denote the same components throughout the specification.

If it is said throughout the specification that a part "includes" a component, this means that the part may further include another component, not excluding other components unless otherwise specified. In addition, the terms "unit", "-er", "module", etc. signify a unit that processes at least one function or operation and may be implemented in hardware, software, or a combination of hardware and software.

Specific terms used in the embodiments of the present invention are provided to assist the understanding of the present invention and may be replaced with other terms within the technical scope of the present invention.

1. Overview of P2P System

Embodiments of the present invention relate to a data channel structure and a control channel structure, which support P2P signaling for one-to-one transmission, one-to-many transmission, and many-to-one transmission across a frequency spectrum. A pair of transmitting and receiving devices use a time-frequency structure of a channel in order to signal a request and a response for transmission of traffic in a specific traffic time slot.

The time-frequency structure is defined by a plurality of tones and symbols. A subset of tones in symbols (e.g., Orthogonal Frequency Division Multiplexing (OFDM) symbols) may be used to identify a specific P2P connection. A protocol may be defined to additionally support one-to-many and many-to-one transmissions in a P2P network. Accordingly, a specific device may identify P2P connections established with a plurality of peer devices using adjacent sets of tones and symbols in a time-frequency structure.

Tones-symbols for one-to-many P2P connections may be allocated to peer devices through a paging channel and selected adjacent tones-symbols may be known implicitly by the protocol of the P2P network.

1.1 Ad-Hoc Communication System

An ad-hoc communication system may include a P2P wireless network. In embodiments of the present invention, a P2P wireless network may be established between two peer devices without the intervention of a central network controller. For example, the P2P wireless network may operate in a frequency spectrum shared between a plurality of radio devices.

FIG. 1 illustrates an exemplary P2P network used in an ad-hoc communication system in relation to a Wide Area Network (WAN).

The P2P network and the WAN may share the same frequency spectrum. Or the P2P network may operate in a different frequency spectrum, for example, a spectrum dedicated to the P2P network. A communication system 100 may include one or more radio devices (e.g., a first device 102, a second device 106, and a third device 112). While only three radio devices are shown in FIG. 1, the communication system 100 may include more or fewer than three radio devices.

In the embodiments of the present invention, a radio device is a P2P device used in a P2P system/P2P communication. In FIG. 1, the first device 102, the second device 106, and the third device 112 may be one of cellular phones, smartphones, laptop computers, small-sized communication devices, small-sized calculation devices, satellite radios, Global Positioning System (GPS) devices, Personal Digital Assistants (PDAs), smart meters, and/or other appropriate devices for communication through the wireless communication system 100.

The P2P communication system 100 may support a WAN and the WAN may include an arbitrary number of heterogeneous ANs (not shown) and one or more ANs, an AN-A 104 and an AN-B 110, for receiving, transmitting, and repeating wireless communication signals between one or more radio devices (e.g., the first device 102, the second device 106, and the third device 112) in one or more sectors/cells/areas. In the present invention, an AN may be referred to as a BS or an AP.

Each of the ANs, AN-A 104 and AN-B 110 may include a plurality of Transmission (Tx) chains and Reception (Rx)

chains. Each of the Tx and Rx chains may include a plurality of components (e.g., processors, modulators, multiplexers, demodulators, demultiplexers, antennas, etc.) related to transmission and reception of wireless signals. The radio devices may receive signals from or transmit signals to an AN during communication through a wideband infrastructure network supported by the communication system 100. For example, when the first device 102 and the second device 106 communicate with the network through the AN, AN-A 104, the third device 112 may communicate with the network through the AN, AN-B 110.

The radio devices may communicate directly with each other through the P2P network (e.g., an ad-hoc network) in a local area without the intervention of a controller such as an AN. P2P communication may be conducted by direct transmission and reception of signals between radio devices. Therefore, there is no need for traversing these signals through an AN (or a BS) or a centralized network. The P2P network may provide high-rate short-range communication (e.g., setting of a type such as home, office, etc.). For example, the first device 102 and the second device 106 may establish a first P2P network 108, while the second device 106 and the third device 112 may establish a second P2P network 114. A P2P Network may be used in the same meaning as a P2P link or a P2P connection.

The P2P network links 108 and 114 may be established between the radio devices in similar geographical areas (e.g. in their areas). However, the radio devices do not need to be related to the same sector and/or cell that will be included in a common P2P network. Further, the P2P networks may be overlapped with each other, or one P2P network may be included in the area of another larger P2P network.

P2P communication may be synchronized between radio devices. For example, the first and second devices 102 and 106 may use a common clock reference to be synchronized with each other. That is, the first device 102 and the second device 106 may acquire timing signals from the AN, AN-A 104. Or the first device 102 and the second device 106 may acquire timing signals from other sources (e.g., GPS satellites or TV broadcasting stations).

1.2 Frame Structure

A description will be given of a frame structure that can be used in the embodiments of the present invention.

Figure 2:
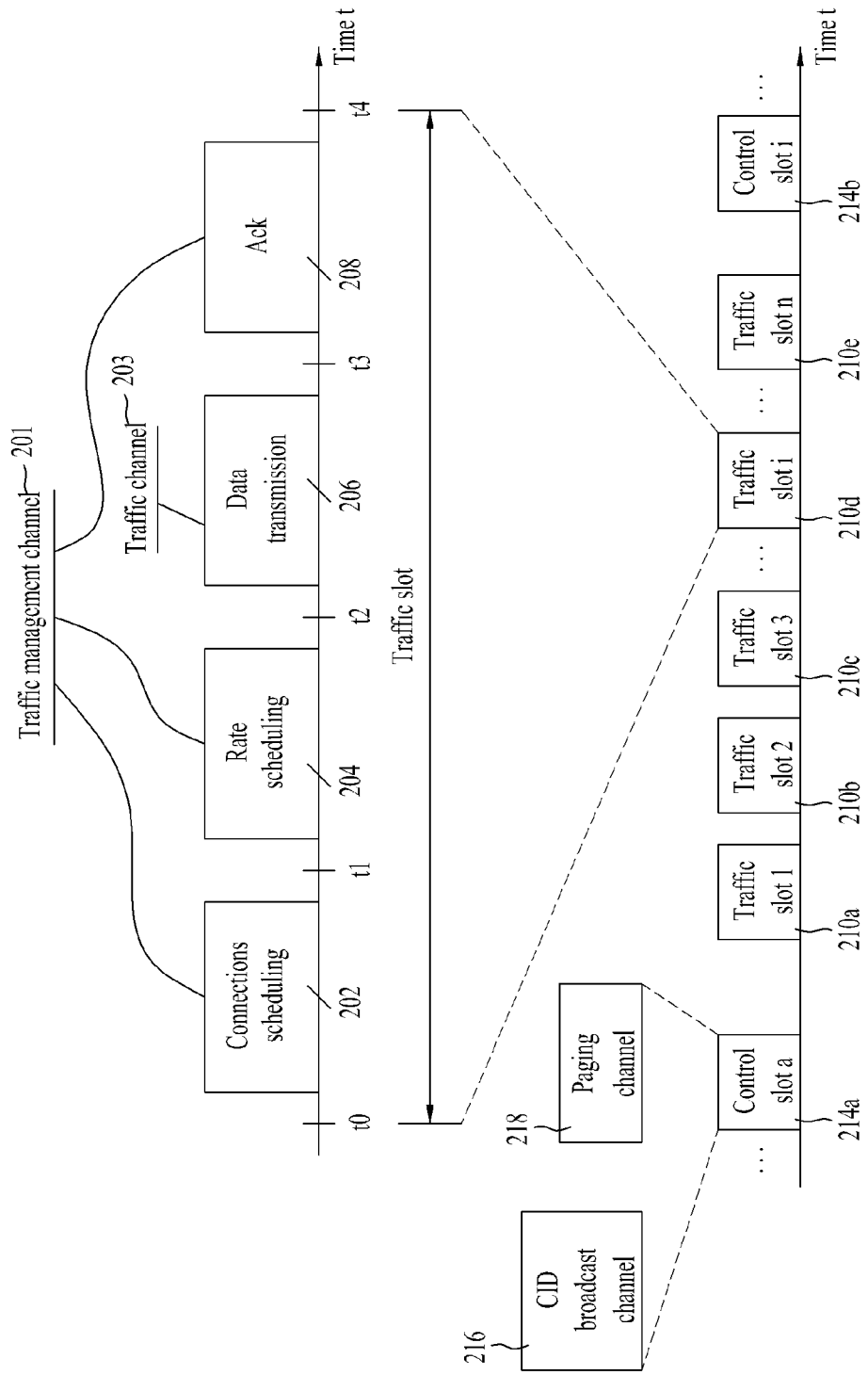
FIG. 2 illustrates an exemplary timing sequence for traffic channel slots available to radio devices in order to transmit traffic after a P2P communication connection is established between the radio devices.

FIG. 2 illustrates an exemplary timing sequence for traffic channel slots available to radio devices in order to transmit traffic after a P2P communication connection is established between the radio devices.

Referring to FIG. 2, a traffic slot 210 may include a traffic management channel 201 and a traffic channel 203. The traffic management channel 201 may be used for signaling (e.g. scheduling and interference management) related to traffic data transmission 206 on the traffic channel 203. The traffic management channel 201 may include a connection scheduling segment 202, a rate scheduling segment 204, and an ACKnowledgment (ACK) segment 208. The data transmission segment 206 may be called the traffic channel 203. The connection scheduling segment 202, the rate scheduling segment 204, the data segment 206, and the ACK segment 208 illustrated in FIG. 2 carry traffic signals.

For the convenience of description, a radio device that transmits data (or traffic) will be referred to as a transmitting device and a radio device that receives data will be referred to as a receiving device.

The connection scheduling segment 202 may be used for the transmitting device to indicate to the receiving device that the transmitting device is ready for transmitting traffic data. The rate scheduling segment 204 enables the transmitting/receiving device to acquire a transmission rate and/or power to be used in transmission of traffic data. Subsequently, the data transmission segment 206 is used to transmit intended traffic data at the acquired transmission rate and/or a rate.

The ACK segment 208 may indicate that the receiving device has or has not received the traffic data in the data transmission segment 206. For example, the traffic slot lasts for about 2 milliseconds. The time sequence structure illustrated in FIG. 2 represents one period of traffic slots. Before traffic data is transmitted in the traffic slot 210, a P2P connection may have been established between the transmitting device and the receiving device through a control slot 214.

The control slot 214 may be inserted between traffic slots from time to time. Traffic slots 210 represent time intervals during which the transmitting device may transmit P2P traffic data to the receiving device on a transmission channel. Each control slot 214 may include a Connection Identifier (CID) broadcast channel 216 and a paging channel 218.

The control slot 214 may take place at a longer interval than a traffic slot. For example, the control slot 214 may take place every second. The control slot 214 functions to establish and maintain a P2P connection between the transmitting device and the receiving device.

The CID broadcast channel 216 indicates P2P connection CIDs used for adjacent connections and also indicates whether the P2P connections are still alive. For example, the transmitting device and the receiving device may determine what CID is in use by monitoring the CID broadcast channel 216.

The paging channel 218 is used for the transmitting device and the receiving device to configure new CIDs for new P2P connections. The paging channel 218 may include a paging request channel and a paging response channel.

1.3 Connection (Link) Setup Procedure in P2P Communication System

Figure 3:
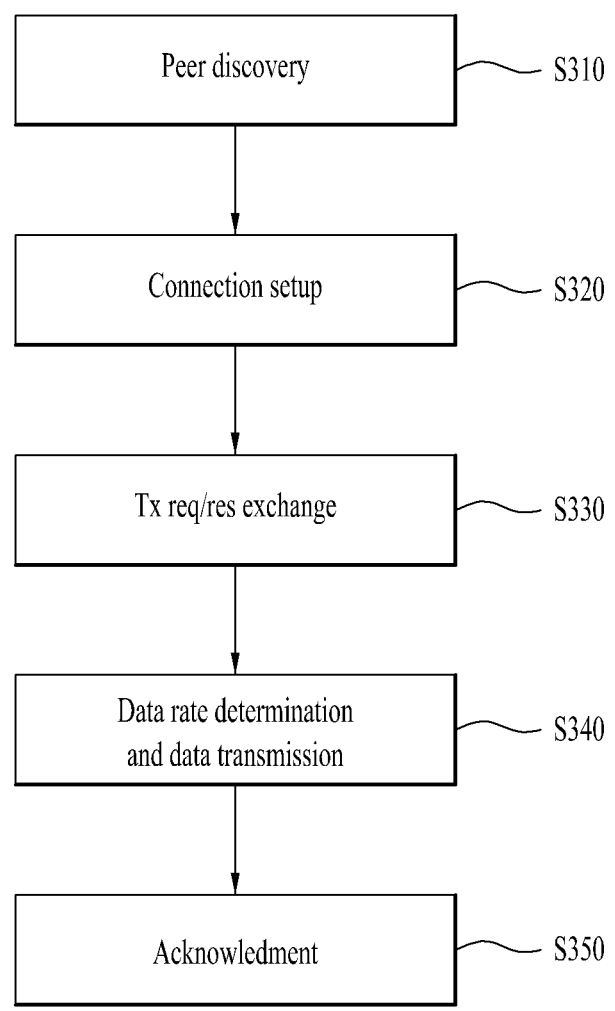
FIG. 3 illustrates an exemplary connection (link) setup procedure used in the present invention.

FIG. 3 illustrates an exemplary connection (link) setup procedure used in the present invention.

The connection (link) setup procedure includes peer discovery (S310), connection setup (S320), Tx Request (REQ)/Response (RES) exchange (S330), data rate determination and data transmission (S340), and acknowledgement (S350). The connection setup operation (S320) may also be called a CID configuration operation.

In the peer discovery operation (S310), peer devices that conduct P2P communication identify each other. Each peer device may maintain and update a device list of peer devices located around the peer device. For this purpose, each peer device may transmit or receive a specific beacon which identifies the beacon-transmitting peer device.

In the connection setup operation (S320), one peer device establishes a connection with a target peer device with which the peer device will conduct actual P2P communication. The peer devices configure a CID between them by the CID configuration operation.

In the Tx REQ/RSP exchange operation (S330), indication signals are transmitted and received to transmit and receive actual data traffic. Each of the peer devices may determine whether to perform data transmission or yield the data transmission to another peer device by exchanging Tx REQ and Tx RSP signals.

In the data rate determination and data transmission operation (S340), a peer device determines a data rate for transmission data and transmits the data actually at the determined data rate. The peer devices may transmit a specific pilot signal and receive a response signal to the specific pilot signal in order to determine a data rate.

In the acknowledgement operation (S350), a receiving peer device transmits an ACK or a NACK for the data transmission to the transmitting peer device.

1.3.1 Peer Discovery

Now, the peer discovery operation that enables peer devices to discover and identify each other will be described below in greater detail. Before traffic is delivered through a P2P connection, two or more P2P radio devices detect and identify each other by the peer discovery operation.

The P2P system 100 may support the peer discovery operation by establishing a P2P network and periodically providing short messages to peers (UEs). For example, in FIG. 1, if the first device 102 is a transmitting device, the first device 102 may periodically broadcast or transmit signals to receiving devices, the second and third devices 106 and 112. When the second device 106 is located in the vicinity of the first device 102, the second device 106 may identify the first device 102 by the periodic signal. After the second device 106 identifies the first device 102, the active P2P link 108 may be established between the first device 102 and the second device 106.

A wireless signal for peer discovery may be transmitted periodically during specific time periods called peer discovery intervals. This transmission timing may be predetermined according to a protocol and known to radio devices. In addition, the radio devices may transmit individual signals that identify them. For example, the first device and/or the second device may transmit a signal during a part of a peer discovery interval. Further, each radio device may monitor signals potentially transmitted by other radio devices during the remaining part of the peer discovery interval.

For example, the wireless signal may be a beacon signal. The peer discovery interval may include a plurality of symbols (e.g., OFDM symbols). The first device 102 may select at least one symbol of the peer discovery interval. The first device 102 may also transmit a corresponding signal in one tone of the selected symbol.

After discovering each other, the radio devices may perform the connection setup operation. For example, the first device 102 and the second device 106 may be connected to each other by the connection setup operation in FIG. 1. Subsequently, the first device 102 may transmit traffic to the second device 106 through the P2P link 108. The second device 106 may also transmit traffic to the first device 102 through the P2P link 108.

1.3.2 Tx REQ/RES Exchange Operation

In the Tx REQ/RES exchange operation S330, one device transmits a Tx REQ signal to another device with which the device wants to communicate and receives a Tx RES signal from the other device. Resources may be allocated for data transmission and reception between the two devices by the Tx REQ/RES exchange operation.

If a Central Unit (CU) (e.g., a BS, an AN, an AP, etc.) controls data scheduling, the Tx REQ/RES exchange operation may be performed through the CU and thus the CU may allocate a resource area. However, without the CU, the Tx REQ/RES exchange operation may include an operation for determining a device to use specific resources by a specific device.

1.4 Channel Structure

Figure 4:
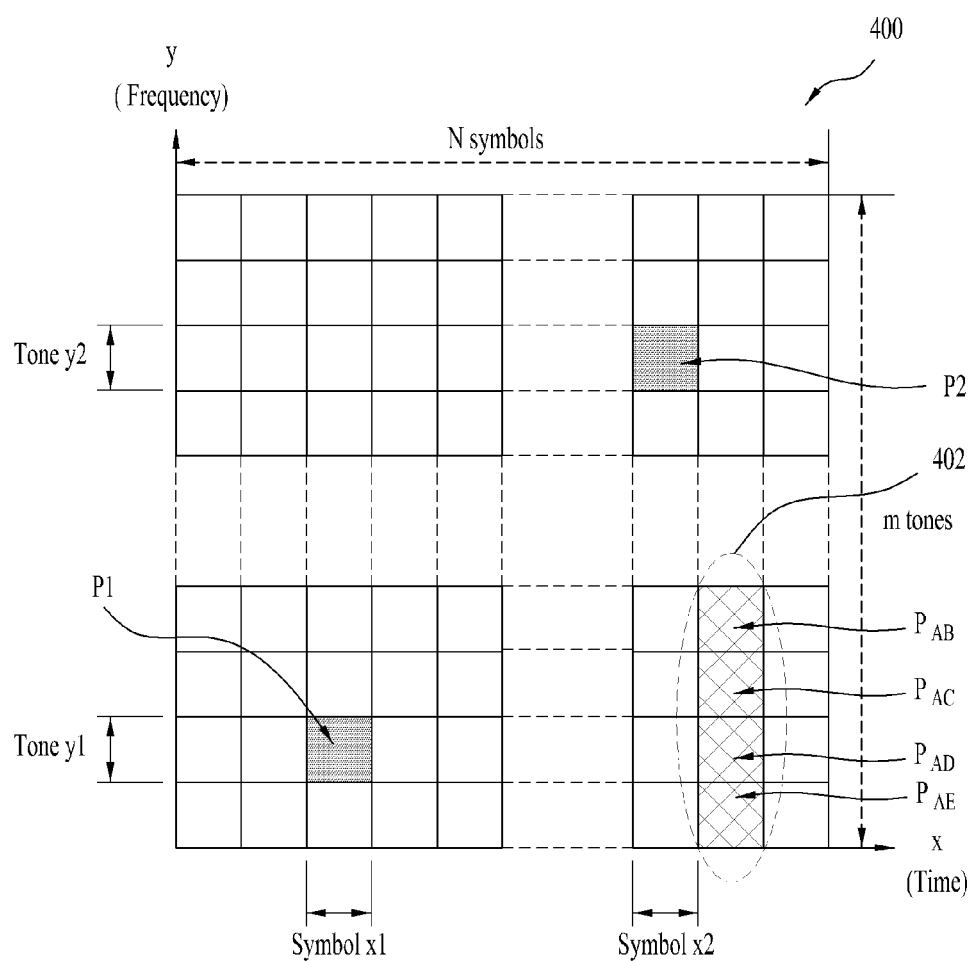
FIG. 4 illustrates an exemplary channel structure related to radio signal transmission in time-frequency resources according to the present invention.

FIG. 4 illustrates an exemplary channel structure related to radio signal transmission in time-frequency resources according to the present invention.

A signal used in FIG. 4 may be an OFDM signal. A time-frequency structure 400 defines resources in which signals are transmitted or received over a P2P network in a control slot (e.g., the control slot 214 illustrated in FIG. 2) and/or a traffic channel slot (the traffic slot 210 in the traffic management channel 201)). In FIG. 4, the x axis may represent N symbols (N is an arbitrary integer) along a time axis and the y axis may represent M tones (M is an arbitrary integer) along a frequency axis.

The transmitting device and/or the receiving device may use the time-frequency structure 400 in the traffic management channel. For example, the time-frequency structure 400 may be considered as a CID resource region in which a CID resource unit corresponding to the CID of each peer device may be selected. For example, the transmitting device may select a CID resource unit in order to signal a Tx REQ to a receiving device corresponding to a connection related to the CID of the transmitting device. The receiving device may select a CID resource unit in order to signal a Tx RES to the transmitting device.

CID resource units available to the transmitting device and the receiving device may be classified preliminarily so that the transmitting device may select a CID resource unit from a specific subset of the total time-frequency structure and the receiving device may select a CID resource unit from another specific subset of the total time-frequency structure in the traffic management channel. For example, the CID resource region of FIG. 4 may be used for the control slot 214 and/or the traffic slot 210 illustrated in FIG. 2. A CID resource unit may be referred to as a "tile" and may be defined by a specific OFDM symbol by a plurality of tones.

The CID resource unit may be defined by a time-frequency combination or a symbol-tone combination. A specific symbol (e.g., a transmission time) may be used in the P2P network in order to identify a current slot interval in the traffic management channel of a traffic slot or a control slot. In this case, a specific tone corresponding to the selected symbol may be determined. The specific tone may be determined based on the ID of a radio device and/or a time variable. A hash function may be used for the time variable or the ID of the radio device so that the position of the selected symbol and/or the position of the specific tone may be calculated using the hash function.

For example, if the time variable is a first value for a given connection, a radio device may calculate symbol x1 and tone y1 using the hash function to thereby transmit a single-tone signal P1 in the CID resource unit illustrated in FIG. 4. If the time variable is a second value for a given connection, a radio device may calculate symbol x2 and tone y2 using the hash function to thereby transmit a single-tone signal P2 in the CID resource unit illustrated in FIG. 4.

Resource units (e.g., tiles 402) corresponding to a subset of the CID resource unit may be used to identify P2P connections (e.g., one-to-many P2P connections) between one radio device and a plurality of radio devices. The tiles 402 may be contiguous or pseudo-randomly selected in the CID resource unit 400.

In FIG. 4, a first P2P connection (between radio device A and radio device B) may be identified by a resource unit PAB, a second P2P connection (between radio device A and radio device C) may be identified by a resource unit PAC, a third P2P connection (between radio device A and radio device D) may be identified by a resource unit PAD, and a fourth P2P connection (between radio device A and radio device E) may be identified by a resource unit PAE.

In FIG. 4, the positions of selected tons-symbols (i.e. resource units) may represent the priority levels of radio signal transmissions in a traffic slot corresponding to a specific time. For example, after a peer device recognizes a Tx REQ, a correspondent peer device may reversely transmit an echo signal or a response at different pseudo-random positions of Rx symbols in the time-frequency structure.

Transmitting devices and/or receiving devices may determine whether to transmit their data (i.e., traffic) in a current time slot based on a Tx REQ, power measurements of echo positions, and position-based priority information. For example, left columns and/or lower rows of the CID resource unit 400 may have lower priority levels than right columns and/or higher rows of the CID resource unit 400.

1.5 Tx REQ/RES Block Design

Methods for designing a Tx REQ/RES block to perform the Tx REQ/RES exchange operation described in Section 1.3.2 will be described below.

A traffic slot described before with reference to FIG. 2 may be referred to as a data slot. The connection scheduling block and/or the rate scheduling block of a traffic management channel is used to transmit and receive a Tx REQ/RES signal in the present invention. In addition, the term block is interchangeably used with segment.

The embodiments of the present invention may be implemented in HARQ. To use HARQ, the present invention provides various methods for designing a Tx REQ/RES block.

For example, (1) a Tx REQ/RES block may be allocated before a data transmission block (hereinafter, referred to as a traffic channel or a transmission slot) in each data slot, (2) data slots for predetermined peer devices may be grouped and a Tx REQ/RES block may be allocated to predetermined data slots on a group basis, or (3) a Tx REQ/RES block may be allocated for all of data slots allocated to all peer devices discovered by the peer discovery operation.

Figure 5:
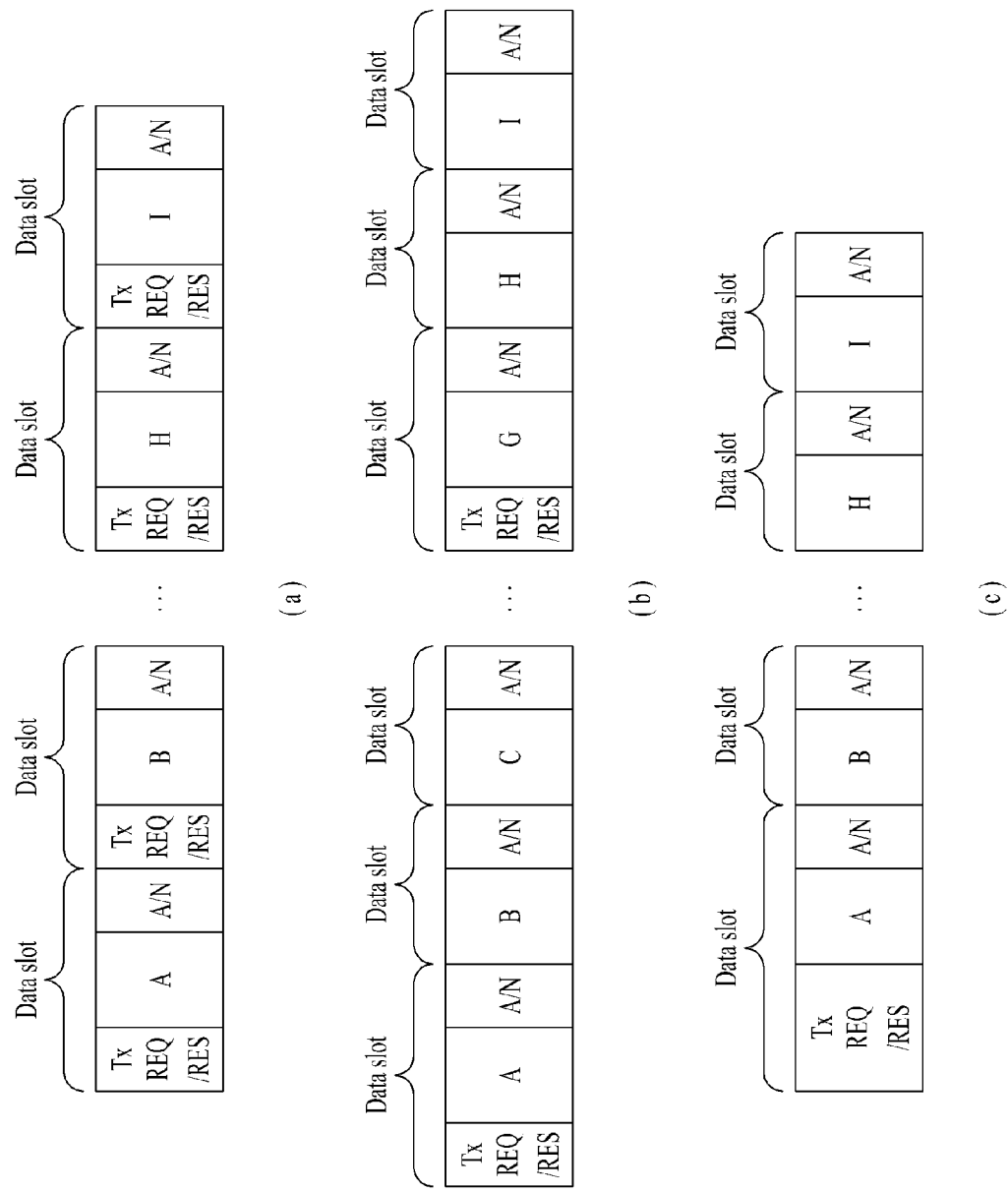
FIG. 5 illustrates methods for designing a Transmission Request/Response (Tx REQ/RES) block applicable to embodiments of the present invention.

FIG. 5 illustrates methods for designing a Tx REQ/RES block applicable to embodiments of the present invention.

FIG. 5(*a*) illustrates a case where a Tx REQ/RES block is allocated in each data slot. For example, it is assumed that a specific transmitting device has discovered peer devices A, B, C, D, . . . H, and I. In this case, data slots are allocated to the respective peer devices and a Tx REQ/RES block may be disposed before a transmission slot to which each peer device is allocated. In FIG. 5(*a*), a data slot includes a Tx REQ/RES, a transmission slot (i.e. a data transmission block), and an ACK segment (A/N).

FIG. 5(*b*) illustrates a case where predetermined peer devices are grouped and one Tx REQ/RES block is allocated to each group. For example, it is assumed that peer devices A, B, C, D, E, F, G, H, and I are grouped into groups (A, B, C), (D, E, F), and (G, H, I). Referring to FIG. 5(*b*), one Tx REQ/RES block is allocated to the group (A, B, C), for scheduling such as resource allocation, etc. and one Tx REQ/RES block is allocated to the group (G, H, I). As a way of grouping, Tx REQ/RES blocks related to communication links corresponding to data transmissions within a priority valid period (i.e. a window) may be transmitted together at one time, which will be described later in detail with reference to FIGS. 9 and 10.

In FIG. 5(*c*), resources may be allocated to all peer devices discovered by the peer device discovery operation by means of one Tx REQ/RES block. The methods proposed in FIG. 5(*b*)/5(*c*) may be more efficient than the method proposed in FIG. 5(*a*) in terms of reduction of overhead caused by signal transmission and prevention of monitoring power consumption.

In FIG. 5(*b*), a Tx REQ/RES block is allocated to a data slot allocated to a P2P device having the highest priority level in each group, whereas in FIG. 5(*c*), a Tx REQ/RES block is allocated to a data slot allocated to a P2P device having the highest priority level among all discovered peer devices.

The methods for allocating/designing a Tx REQ/RES block, described above with reference to FIG. 5 may be implemented in various manners. For example, if an HARQ retransmission is required, resources need to be allocated for the retransmission. In this case, a Tx REQ/RES block may be allocated only when a NACK signal is transmitted.

If Tx REQ/RES blocks for respective communication links are separated independently in time, there is no problem in receiving a Tx REQ/RES from another device at one device. However, in the case of a frame structure that does not guarantee a sufficient time to receive a Tx REQ/RES signal, the following operations are performed.

If a retransmission is required, a transmitting device of each communication link may transmit a Tx REQ signal in a Tx REQ block on the communication link and may receive a Tx RES signal from a receiving device of the communication link together with a Tx RES signal from a receiving device of another communication link. Thus, the transmitting device may perform a priority comparison mechanism.

Or the receiving device may perform a priority comparison mechanism by receiving a Tx REQ signal in the Tx REQ block together with a Tx REQ signal of another communication link and thus may report a result regarding the Tx RES signals.

2. Method for Managing HARQ Retransmission on P2P Communication Link

The above description of Section 1 may be applied to embodiments of the present invention which are described below. That is, the P2P network described in FIG. 1, the timing sequence for traffic channel slots described in FIG. 2, the connection (link) setup operation described in FIG. 3, the channel structure described in FIG. 4, and/or the methods for designing a Tx REQ/RES block described in FIG. 5 are applicable to the embodiments of the present invention.

The term communication link may be interchangeably used with P2P link or D2D link. Hereinbelow, a P2P device that wants to transmit data in a P2P system may be referred to as a transmitting device and a P2P device that receives data may be referred to as a receiving device. During retransmission, the transmitting device may be referred to as a Tx-REQ device and the receiving device may be referred to as a Tx-RES device. For the convenience of description, a transmitting device and a Tx-REQ device are referred collectively to as a first device and a receiving device and a Tx-RES device are referred collectively to as a second device in the embodiments of the present invention.

Figure 6:
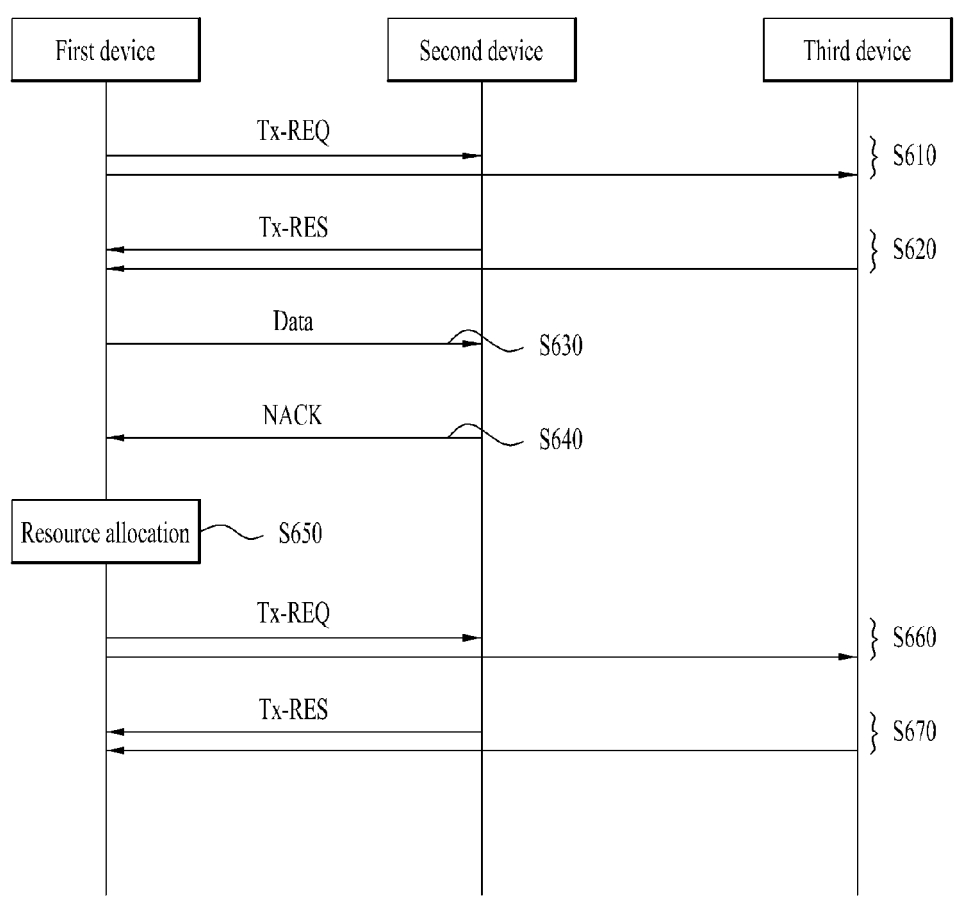
FIG. 6 illustrates one of methods for controlling retransmission for P2P devices according to an embodiment of the present invention.

FIG. 6 illustrates one of methods for controlling retransmission for P2P devices according to an embodiment of the present invention.

In FIG. 6, it is assumed that a first device is a transmitting device and second and third devices are peer devices discovered during peer device discovery. It is also assumed that the second device is a receiving device being the counterpart of the first device.

Referring to FIG. 6, the first device transmits a Tx-REQ signal to the second and third devices, to allocate resources for a data transmission to the second device (S610).

The second and third devices transmit Tx-RES signals to the first device in response to the Tx-REQ signal (S620).

If resources are allocated to the first device and a transmission slot is determined by steps S610 and S620, the first device transmits data to the second device in the transmission slot (S630).

If an error occurs to the data transmitted by the first device or the data is lost on a radio channel, the second device transmits a NACK signal to the first device (S640).

Upon receipt of the NACK signal, the first device allocates specific resources (i.e., a transmission slot) for a retransmission, determining that a retransmission is required. In addition, the first device links the resources allocated for the retransmission to the previous data transmission slot (S650).

Subsequently, the first device transmits a Tx-REQ signal (or a scheduling request signal) to the second and third devices, thus providing information about the allocated retransmission slot to the second and third devices (S660).

The second and third devices transmit Tx-RES signals to the first device in response to the Tx-REQ message received in step S660 (S670).

In an aspect of the present invention, the third device as well as the first device may monitor the NACK signal in FIG. 6. In this case, the third device may be aware that a retransmission will take place in the next data transmission slot by receiving the NACK signal.

In another aspect of the present invention, a Tx-REQ signal for a P2P device having a higher priority level in step S610 may be linked implicitly to an actual data transmission slot. For example, it may be regulated that a communication link transmitting a highest-priority Tx-REQ signal automatically transmits data in a first data slot and a communication link transmitting a second highest-priority Tx-REQ signal automatically transmits data in a second data slot.

Hereinafter, a communication link on which data is currently transmitted and received is defined as a target link (or a first link) and a communication link adjacent to the target link is defined as an adjacent link (or a second link).

Preferably, a transmitting device of a target link, which needs to retransmit data, that is, which has received a NACK signal as a feedback for a previous transmission, transmits a Tx-REQ message (i.e. a signal indicating data transmission) before the next retransmission slot. A receiving device of the target link transmits a Tx-RES signal (i.e. a signal acknowledging data reception) to the transmitting device.

A transmitting device of an adjacent link, which shares a transmission slot for use in data transmission of the transmitting device of the target link, may receive a Tx-REQ or Tx-RES signal from the target link device before data transmission and may determine whether to perform or yield data transmission by the priority comparison mechanism.

For example, if the priority level of the transmitting device of the adjacent link is lower than that of the transmitting device of the target link, the transmitting device of the adjacent link yields data transmission. If the priority level of the transmitting device of the adjacent link is higher than that of the transmitting device of the target link, the transmitting device of the adjacent link transmits its data.

The transmitting device or the receiving device of the target link may receive a Tx REQ signal or a Tx RES signal from the transmitting device or the receiving device of the adjacent link and determine whether to retransmit data or yield data transmission by the afore-described priority comparison mechanism.

In embodiments of the present invention, in every P2P communication, a Tx REQ/RES signal that requests/acknowledges data transmission is basically transmitted/received before the data transmission. That is, P2P devices may transmit their data or yield the data transmission according to their priority levels based on a Tx REQ/RES signal (because they may also monitor a Tx REQ/RES signal of another communication link). Therefore, the P2P devices may allocate resources for HARQ retransmissions of all adjacent communication links by exchanging Tx REQ and Tx RES signals without an additional complex operation for allocating resources for retransmissions.

Upon receipt of an ACK signal as a feedback for a previous transmission, the transmitting device of the target link may skip transmission of a Tx RES signal because it does not affect devices of other adjacent communication links. Likewise, when the receiving device of the target link transmits an ACK signal as a feedback for a previous reception, the receiving device may skip transmission of a Tx RES signal.

In a system where an HARQ transmission timing is preset (e.g., if the system is co-existent with a cellular network, a basic structure of the network may still be used), an HARQ retransmission slot is naturally determined for the transmitting device in the above methods. Accordingly, there is no need for additional signaling for the retransmission. Even in a system that can control a retransmission slot variably, transmitting UEs basically implement the above methods according to the Tx REQ/RES signal comparison mechanism.

In another aspect of the present invention, a target link that occupies a previous data transmission slot may have a higher priority level in a next Tx REQ/RES slot (e.g., a highest priority level upon generation of a retransmission). If an ACK is generated for a previous data transmission, the transmitting device of the target link does not transmit a signal in a Tx REQ/RES slot. Thus, the transmitting device of an adjacent link may transmit a data signal in the transmission slot. On the other hand, if a NACK is generated for the previous data transmission, the transmitting device of the target link may allocate retransmission resources by transmitting a Tx REQ signal and perform retransmission.

The afore-described embodiments of the present disclosure may further include the following technical features.

In the embodiments of the present disclosure, a transmitting device of an adjacent link may determine whether data is to be retransmitted, without monitoring an ACK/NACK signal for a data transmission.

Or the devices of the adjacent link may determine whether a retransmission will be performed in a next data transmission slot by monitoring an ACK/NACK for a data transmission of a target link.

If the priority levels of communication links change in each data transmission slot, a specific priority level may be reserved for a retransmission of previously transmitted data and the other priority levels may be changed.

Figure 7:
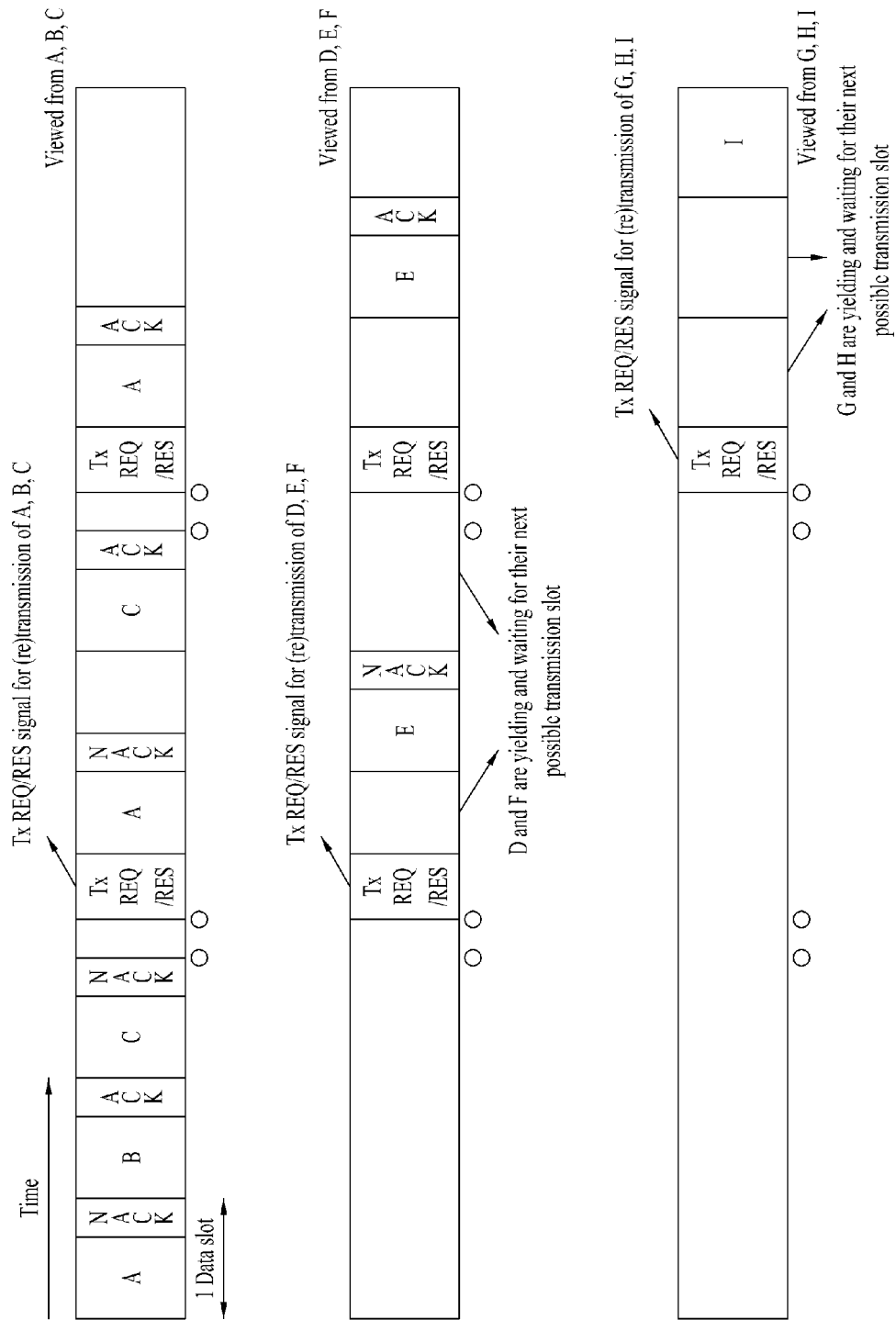
FIG. 7 illustrates one of methods for managing Hybrid Automatic Repeat reQuest (HARQ) retransmission in transmission slots according to an embodiment of the present invention.

FIG. 7 illustrates one of HARQ retransmission management methods in transmission slots according to an embodiment of the present invention.

In FIG. 7, it is assumed that transmission slots have already been allocated to transmitting devices of a communication link. That is, initial transmission slots may be configured by exchanging Tx REQ/RES signals between the devices or may be scheduled by an eNB as a CU.

It is assumed that peer devices A, B, C, D, E, F, G, H, and I have been discovered by peer discovery, their priority levels are A>B>C>D>E>F>G>H>I, and each transmission block for data transmission is allocated in units of three data slots (i.e. the method of FIG. 5(b) or FIG. 5(c) may be applied to FIG. 7).

For the convenience of description, the transmission slots are illustrated separately from the viewpoints of (A, B, C), (D, E, F), and (G, H, I). In real implementation, the transmission slots have already been allocated in time order to all of the transmitting devices according to the priority levels of the transmitting devices.

Referring to FIG. 7, the transmitting devices A, B, and C transmit data to their receiving devices in transmission slots allocated to them, respectively. The transmitting devices A and C receive NACK signals and the transmitting device B receives an ACK signal.

Because the transmitting devices A and C receive NACK signals, they transmit/receive Tx REQ/RES signals in a Tx REQ/RES slot. The transmitting devices A and C are allocated transmission slots that were allocated to the transmitting devices D and F according to their priority levels, for retransmission and retransmit the data in the transmission slots. Since the transmitting device B has received an ACK signal, the transmitting device B does not need to perform a Tx REQ/RES procedure to be allocated retransmission resources. Accordingly, a retransmission area allocated to the transmitting device B was initially allocated to the transmitting device E and thus the transmitting device E may transmit data in the resource area.

The transmitting devices A and E receive NACK signals from their receiving devices. Therefore, the Tx REQ/RES procedure is performed again and transmission slots for retransmission are allocated to the transmitting devices A and E. According to the priority levels of the links and/or the devices, transmission slots allocated to the transmitting devices G and H are allocated to the transmitting devices A and E, for retransmission. However, since a transmission slot of the transmitting device I is not allocated to another device, the transmitting device I may transmit data in its transmission slot.

Figure 8:
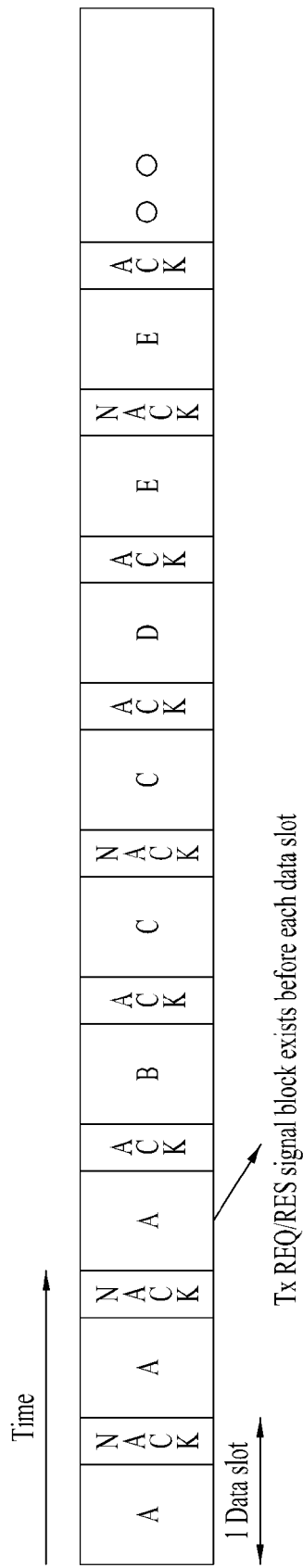
FIG. 8 illustrates another of the methods for managing HARQ retransmission in transmission slots according to an embodiment of the present invention.

FIG. 8 illustrates another of the HARQ retransmission management methods in transmission slots according to an embodiment of the present invention.

In FIG. 8, it is assumed that peer devices A, B, C, D, E, F, G, H, and I have been discovered by peer discovery and their priority levels are A>B>C>D>E>F>G>H>I. In addition, for every slot, a transmitting device to transmit data is determined according to the priority levels of the transmitting devices of each communication link in FIG. 8. That is, a Tx REQ/RES block is always allocated to each data slot (the method of FIG. 5(a) is available). However, the Tx REQ/RES block before each transmission slot is not shown in FIG. 8, for the convenience of description.

Referring to FIG. 8, the transmitting device A having the highest priority level transmits data in a first transmission slot. Because the transmitting device A receives a NACK signal for the transmitted data, the transmitting device A is allocated the next transmission slot as a retransmission slot and retransmits the data in the retransmission slot.

That is, the transmitting devices may transmit data sequentially based on their priority levels and when a retransmission is required (upon receipt of a NACK signal), they may retransmit the data until the data transmission is successful. Therefore, when the transmitting device A succeeds in data transmission, the transmitting device B having the next priority level transmits data. In this manner, data transmission is performed until the transmitting device I transmits data.

Since a transmitting device having a lower priority level may suffer from a very long delay in data transmission because of data retransmissions from transmitting devices having higher priority levels, the number of retransmissions for each transmitting device may be limited to a predetermined value (e.g., 4 or 8).

Figure 9:
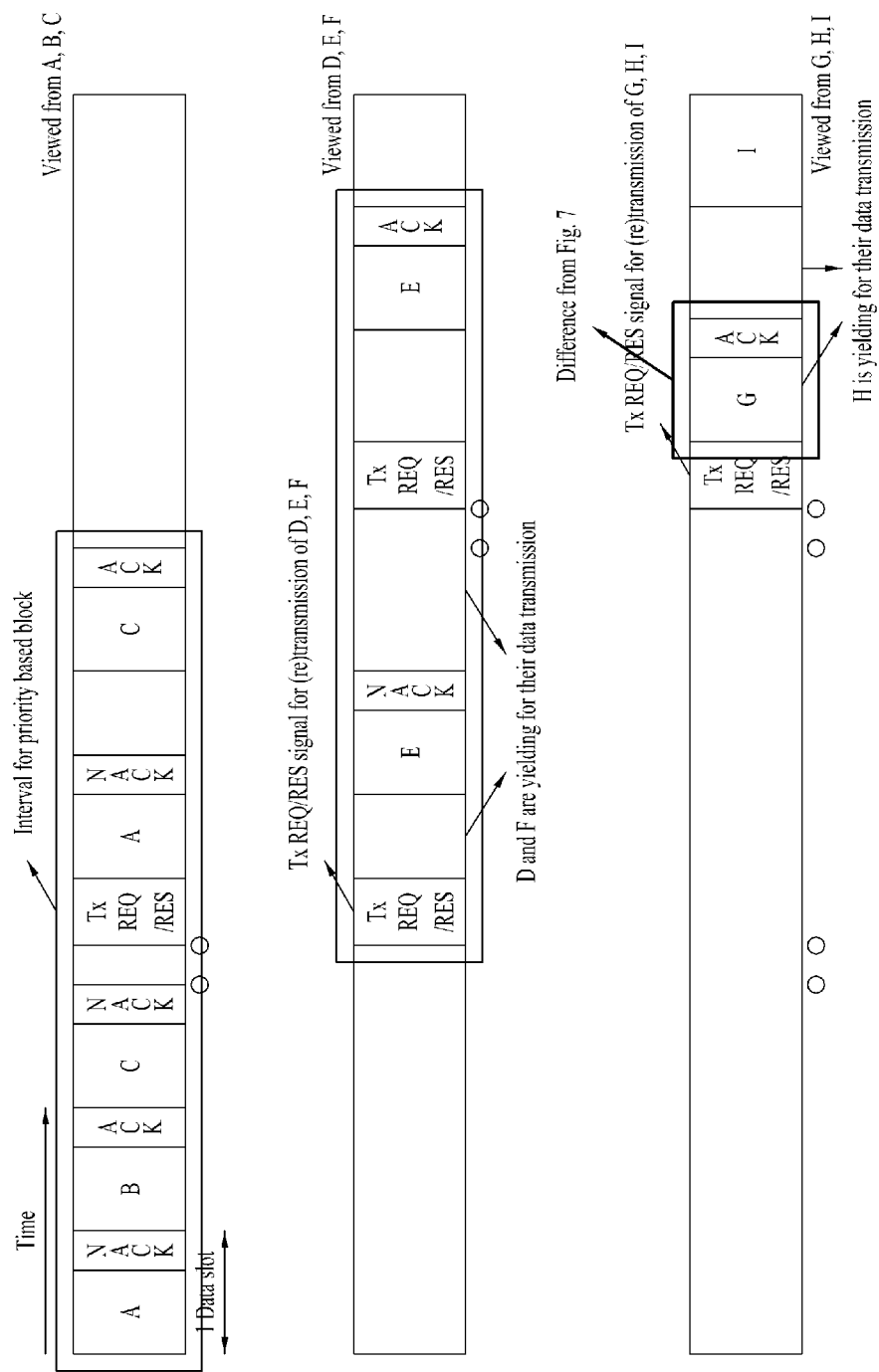
FIG. 9 illustrates a third of the methods for managing HARQ retransmission in transmission slots according to an embodiment of the present invention.

FIG. 9 illustrates a third of the methods for managing HARQ retransmission in transmission slots according to an embodiment of the present invention.

The method illustrated in FIG. 9 is basically based on the same assumption as in FIG. 7, except that a window size for assigning a specific or absolute priority level to a retransmission is limited in FIG. 9. Compared to the method of FIG. 7 in which if a transmitting device needs to retransmit data, the transmitting device is continuously allocated a transmission slot for the retransmission according to its priority level, a transmitting device is allocated a transmission slot for retransmission only within an allocated window size and retransmits data in the transmission slot in FIG. 9.

The window size may be set explicitly between transmitting devices during a connection setup procedure or an initial Tx REQ/RES exchange procedure. Or if a CU (i.e., an eNB) exists, the CU may notify each transmitting device of a window size.

In FIG. 9, the window size may be set to 6 data slots. Therefore, even though the transmitting device A continuously receives NACK signals for data transmissions, the transmitting device A may not retransmit data any longer if it is outside the window size. While the transmitting device A occupies the transmission slot allocated to the transmitting device G, for a retransmission and thus the transmitting device G may not transmit data in the transmission slot in FIG. 7, the transmitting device G may transmit data in its allocated transmission slot in FIG. 9.

In one aspect of the embodiment of the present invention, if a priority level for a retransmission is set by an inverse function of the number of retransmissions, the priority level of a transmitting device that retransmits data may be decreased as the number of retransmissions is increased. That is, data transmission may be guaranteed for a transmitting device having a lower priority level by limiting the number of data retransmissions for a transmitting device having a higher priority level.

In another aspect of the embodiment of the present invention, if a transmitting device needs retransmission, the reliability of data transmission of the transmitting device may be increased by increasing the priority level of the transmitting device.

Figure 10:
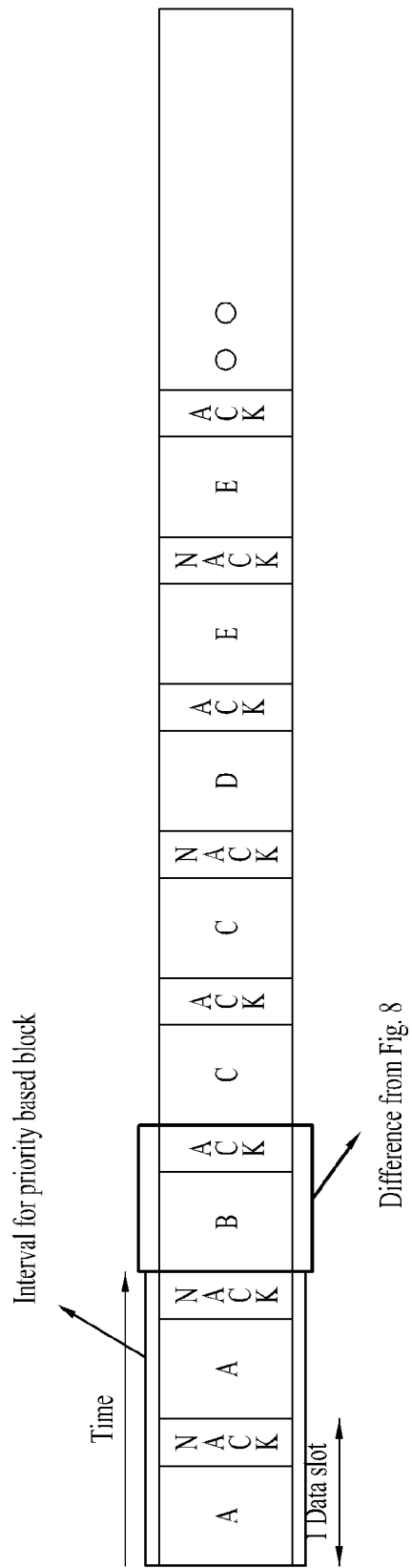
FIG. 10 illustrates a fourth of the methods for managing HARQ retransmission in transmission slots according to an embodiment of the present invention.

FIG. 10 illustrates a fourth of the methods for managing HARQ retransmission in transmission slots according to an embodiment of the present invention.

The method illustrated in FIG. 10 is basically based on the same assumption as in FIG. 8, except that a window size for assigning a specific or absolute priority level to retransmission is limited in FIG. 10. Compared to the method of FIG. 8 in which if a transmitting device needs to retransmit data, the transmitting device is continuously allocated a transmission slot for the retransmission according to its priority level, a transmitting device is allocated a transmission slot for retransmission only within an allocated window size and retransmits data in the transmission slot in FIG. 10. The window size may be set dynamically according to a system environment and/or the amount of data to be transmitted from each transmitting device during a connection setup procedure or an initial Tx REQ/RES exchange procedure.

In FIG. 10, a window size allocated to the transmitting device A may be set to 2 data slots. That is, since the transmitting device A is allowed to retransmit data within the allocated window size, even though the transmitting device A continuously receives NACK signals for data transmissions, a third transmission slot may not be allocated as a retransmission slot to the transmitting device A, compared to in FIG. 8. Therefore, the transmitting device B having the next priority level may transmit data in the third transmission slot.

3. Method for Managing HARQ Retransmission on P2P Communication Link by Central Unit The above description of Section 1 may be applied to embodiments of the present invention which are described below. That is, the P2P network described in FIG. 1, the timing sequence for traffic channel slots described in FIG. 2, the connection (link) setup operation described in FIG. 3, the channel structure described in FIG. 4, and/or the methods for designing a Tx REQ/RES block described in FIG. 5 are applicable to the embodiments of the present invention.

Figure 11:
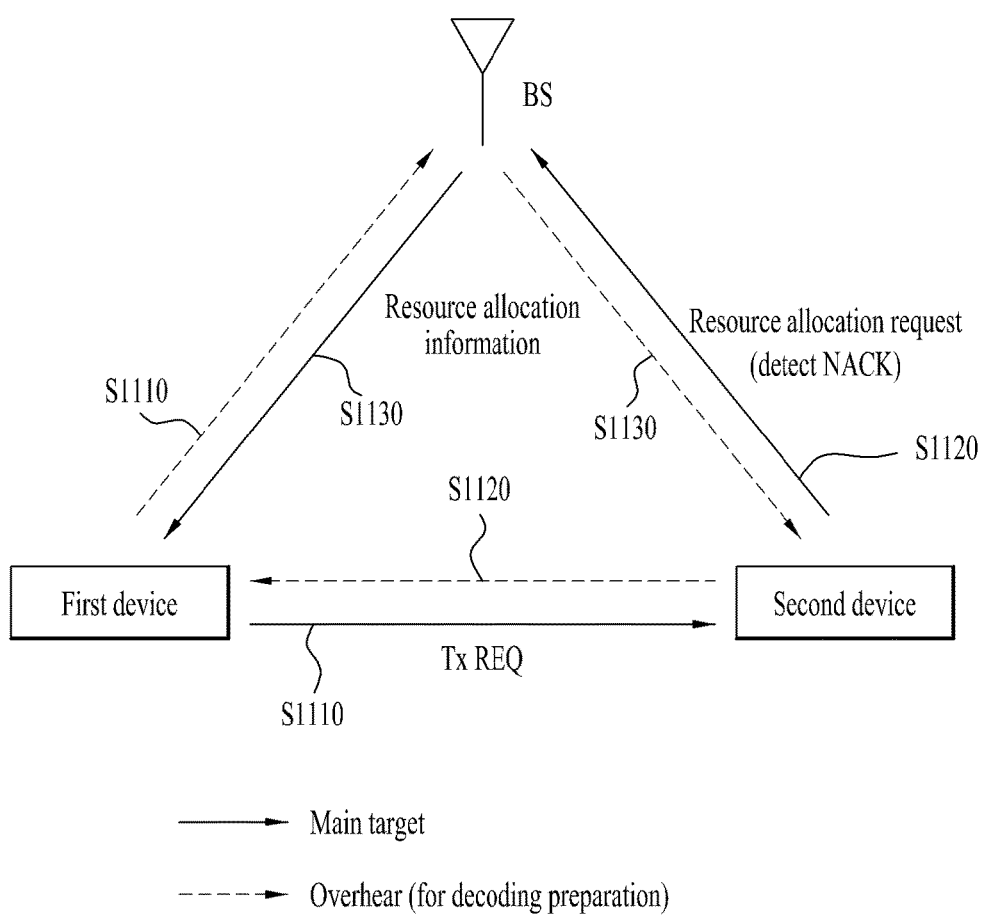
FIG. 11 illustrates one of methods for managing HARQ retransmission in a central unit according to an embodiment of the present invention.

FIG. 11 illustrates one of methods for controlling retransmission by a CU according to an embodiment of the present invention.

In FIG. 11, it is assumed that a first device is a transmitting device that is to transmit data and a second device is a receiving device that receives data. An eNB is used as the CU.

Referring to FIG. 11, the first device transmits a Tx-REQ signal to the second device to allocate resources for an initial data transmission to the second device (S1110).

Upon receipt of the Tx-REQ signal, the second device transmits a resource allocation request signal including identification information about the first device to the eNB in order to request resource allocation for data transmission between the first and second devices (S1120).

The resource allocation request signal may include at least one of channel state information about a communication link between the first and second devices, identification information about a transmitting device of another communication link (e.g., an adjacent link), and channel state information about the adjacent link.

If a plurality of adjacent links exist, the receiving UE may report identification information about transmitting devices according to their priority levels. For example, the second device may transmit identification information about transmitting devices having the highest priority level among the transmitting devices of the adjacent links.

Upon receipt of the resource allocation request signal, the eNB may allocate resources for data transmission between the first and second devices and transmit resource allocation information about the allocated resources to the first and second devices (S1130).

It is assumed in FIG. 11 that the eNB has knowledge of Tx-REQ/RES situations between all devices. That is, the eNB may efficiently allocate resources for a plurality of communication links by overhearing a Tx-REQ/RES signal exchange procedure between devices.

If a retransmission situation occurs in FIG. 11, that is, if the second device transmits a NACK signal to the first device, the first device may perform steps S1110 to S1130 to be allocated retransmission resources.

In one aspect of the embodiment of the present invention, both the eNB and the first device may receive the resource allocation request signal in step S1120. That is, the first device may be aware that allocation of retransmission resources has been requested to the eNB by overhearing the resource allocation request signal.

For example, after the initial data transmission, the first device may determine whether to retransmit data by monitoring the resource allocation request signal later. If the data received from the first device has an error, the second device may transmit the resource allocation request signal directly to the eNB, without transmitting a NACK signal to the first device in FIG. 11. In this case, the first device may be aware that a retransmission situation has been generated.

In another aspect of the embodiment of the present invention, the same resource allocation request procedure as for an initial data transmission may be performed for a retransmission. That is, upon receipt of a Tx REQ signal for the initial data transmission, the second device requests resource allocation to the eNB. Then the eNB allocates resources for the initial data transmission and transmits resource allocation information about the allocated resources to the first and second devices. Subsequently, as the second device transmits a Tx RES signal to the first device, the first device and the second device may transmit and receive data.

In this case, a resource allocation request signal may be identical for the initial transmission and the retransmission, from the perspective of the CU (i.e., the eNB). That is, the same resource allocation request signal may be used for both the initial data transmission and the retransmission.

In another aspect of the embodiment of the present invention, different resource allocation request signals may be used for an initial data transmission and a retransmission. The resource allocation request signal for a retransmission may include a 1-bit indicator indicating a resource allocation request for a retransmission so that the eNB may distinguish the resource allocation request for an initial transmission from the resource allocation request for a retransmission.

In another aspect of the embodiment of the present invention, an HARQ procedure may be defined between the second device being a receiving device and the eNB. For example, if the second device has an error in data received from the first device, the second device transmits a NACK signal to the eNB. Upon receipt of the NACK signal, the eNB allocates retransmission resources and transmits resource allocation information about the allocated resources to both the first and second devices. The first device may retransmit data to the second device in the resource area allocated for the retransmission.

In another aspect of the embodiment of the present invention, if the second device being a receiving device needs to receive retransmission data, the second device may transmit a NACK signal and both the eNB and the first device being a transmitting device may receive the NACK signal. Herein, resource allocation for retransmission may be defined without additional signaling by to a method known to all of the eNB and the P2P devices.

For example, upon receipt of a NACK signal, a P2P device may retransmit data in pre-configured resources for the retransmission. Further, the eNB may schedule resources based on the assumption that the pre-configured resources are used by the P2P device.

Figure 12:
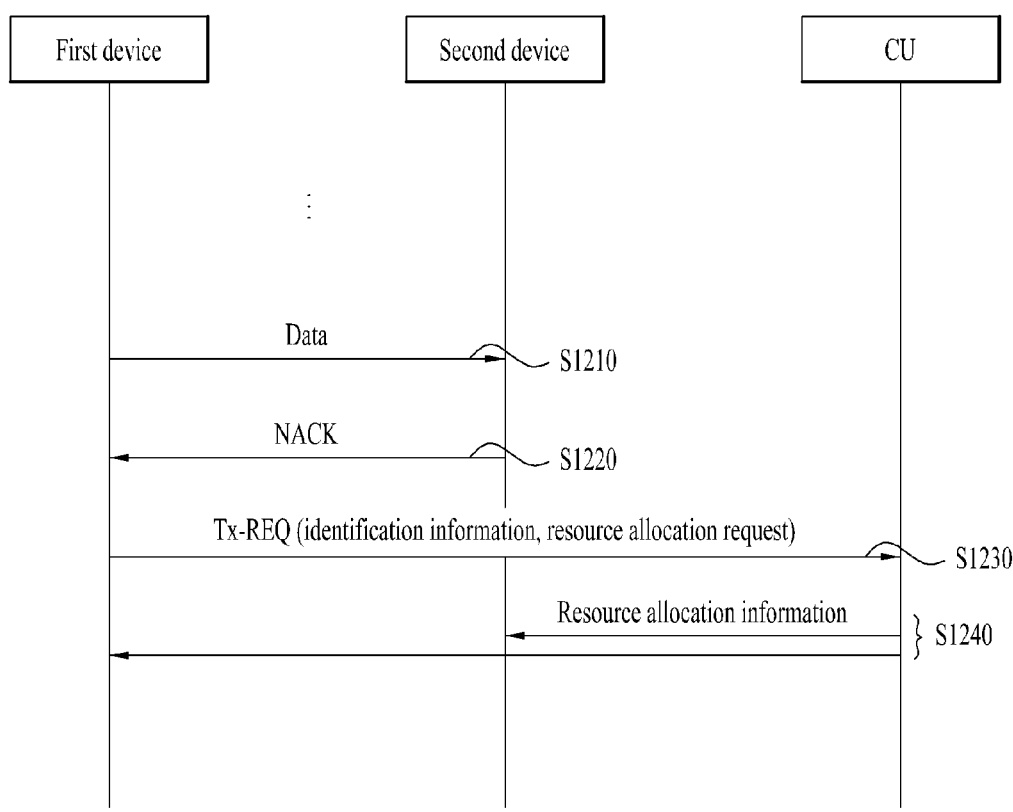
FIG. 12 illustrates another of the methods for managing HARQ retransmission in a central unit according to an embodiment of the present invention.

FIG. 12 illustrates another of the methods for managing HARQ retransmission by a CU according to an embodiment of the present invention.

In FIG. 12, it is assumed that a resource allocation procedure for an initial data transmission is identical to a Tx REQ/RES exchange procedure described in FIG. 11 or Section 1. Accordingly, the first device transmits data to the second device in an allocated resource area (i.e. an allocated transmission slot (S1210).

If the transmitted data has an error, the second device feeds back a NACK signal to the first device (S1220).

If the first device needs to retransmit the data, the first device may request allocation of a resource area for the retransmission by transmitting a Tx-REQ signal to the central unit, not to the second device (S1230).

Herein, the Tx-REQ signal may include at least one of identification information about the first device, channel state information about a communication link between the first and second devices, identification information about a transmitting device of another communication link (e.g., an adjacent link), and channel state information about the adjacent link.

Upon receipt of the Tx-REQ signal from the first device, the eNB allocates resources for the retransmission and transmits resource allocation information about the allocated resource area to the first and second devices (S1240).

Therefore, the first and second devices may perform an HARQ retransmission procedure based on the received resource allocation information.

4. Method for Managing HARQ Retransmission on Plural P2P Communication Links 4.1 In the case where a communication link having a higher priority level occupies a transmission data slot of another communication link, for a retransmission in the embodiments of the present invention described in Section 3, a device of the communication link having the higher priority level may indicate to a CU (e.g., an eNB) whether data is to be retransmitted (e.g. by an ACK/NACK signal), so as to prevent the CU from scheduling resources for the other communication link.

For example, if the eNB receives a notification indicating whether data is to be retransmitted from the device of the communication link having the higher priority level (e.g., by a Tx-REQ signal or the like), the eNB does not allocate a corresponding data slot to other communication links having lower priority levels, for the retransmission. Herein, the eNB may allocate a data slot for each communication link by new scheduling.

In an environment where the eNB may receive channel state information (e.g., Signal to Interference and Noise Ratios (SINRs)/Signal to Interference Ratios (SIRs)/Carrier to Interference and Noise Ratios (CINRs), etc.) about a plurality of communication links from a plurality of P2P devices, even though the eNB receives a NACK signal from a device of a communication link having a higher priority level, the eNB may allocate the same data slot to a plurality of communication links according to the channel state information.

For example, the eNB may determine whether to allocate a data slot based on a threshold parameter. That is, if an interference level of channel state information does not exceed a system threshold, the eNB may allocate one data slot to a plurality of communication links.

Further, the eNB may determine a communication link to occupy a data slot by receiving a Tx REQ signal from a device of each communication link in each Tx REQ/RES block and may accordingly allocate the data slot to the communication link. That is, if the same data slot is allocated to a plurality of communication links, the eNB may schedule and allocate a resource area by determining whether to allocate a data slot based on the priority levels of the communication links and/or channel information about the communication links.

4.2 In the embodiments of the present invention, the eNB may allocate resources (i.e. a data slot) for data retransmission in advance just by one scheduling command, taking into account a maximum number of retransmissions.

In this case, the eNB may control the pre-allocated data slot semi-statically. For example, the eNB may define a specific period over which a data retransmission is allowed and indicate the specific period to devices of a corresponding communication link.

In addition, the pre-allocated data slot for a retransmission may be terminated early. For example, a specific indication signal (e.g., an early termination indication signal) signaled to an eNB by a P2P device may be defined. Thus, a retransmission operation may be terminated by transmitting the specific indication signal to the eNB despite the pre-allocated data slot (or a window size for retransmission).

4.3 If the eNB can control data slot allocation to P2P devices, the P2P devices may transmit Tx-REQ signals to the eNB, for allocation of a data slot for a retransmission, without using an ACK/NACK block (see FIG. 2) in each data slot. Herein, the eNB may transmit a Tx-RES signal in response to the Tx-REQ signal.

For example, a receiving device of each communication link may request allocation of a data slot for a retransmission to the eNB by transmitting a Tx REQ signal to the eNB, without transmitting an ACK/NACK signal in relation to a data transmission and a retransmission request. Herein the receiving device of the communication link may determine whether data will be retransmitted and check scheduling information about a reallocated resource area by receiving a Tx-RES signal (a response to the Tx-REQ signal) from the eNB. Or the receiving device may determine whether a NACK is to be generated and/or a retransmission is to be performed by receiving a Tx-REQ signal that the transmitting device transmits to the eNB.

4.4 In another embodiment of the present invention, as a receiving device still uses an ACK/NACK signal, the power consumption of the receiving device may be prevented. For example, upon receipt of an ACK signal, a transmitting device may enter Power Saving Mode (PSM). If the transmitting device receives a NACK signal, the transmitting device may determine whether data is to be retransmitted, from a Tx-RES signal transmitted by an eNB (or a Tx-REQ signal transmitted by the receiving device).

In the afore-described embodiments of the present disclosure, the eNB may transmit data slot allocation information for a retransmission in a Tx-REQ signal (or a signal of another type). Herein, the transmitting device may check scheduling information about a data slot for the retransmission by the Tx-REQ signal transmitted by the eNB.

5. Apparatus Configuration

Figure 13:
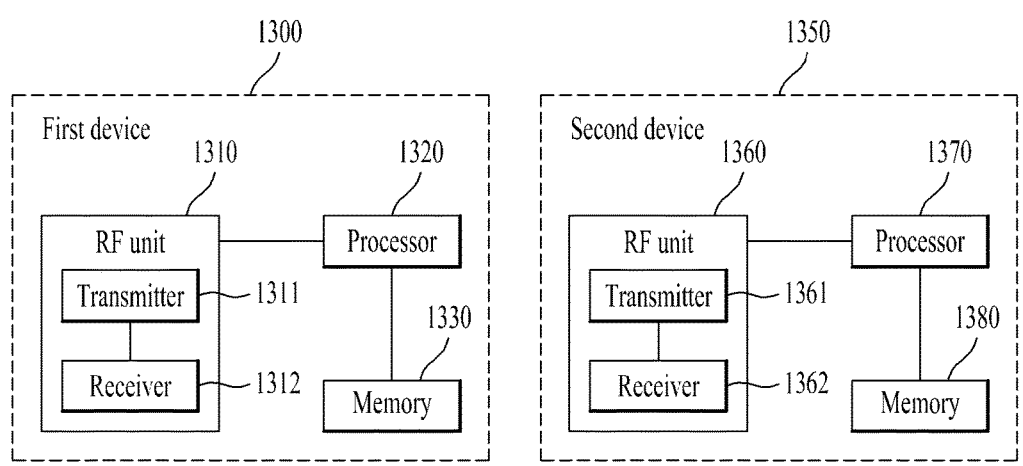
FIG. 13 is a block diagram of peer devices to which the embodiments of the present invention illustrated in FIGS. 1 to 12 can be applied, according to an embodiment of the present invention.

FIG. 13 is a block diagram of apparatuses that can implement the methods described before with reference to FIGS. 1 to 12.

In FIG. 13, each of a first device 1300 and a second device 1350 as peer devices may include a Radio Frequency (RF) unit 1310 or 1360, a processor 1320 or 1370, and optionally, a memory 1330 or 1380. While the configurations of two P2P devices are shown in FIG. 13, more P2P devices may build a P2P communication environment.

Each RF unit 1310 or 1360 may include a transmitter 1311 or 1361 and a receiver 1312 or 1362. The transmitter 1311 and the receiver 1312 of the P2P device 1300 are configured to transmit and receive signals to and from an eNB 1350 and other P2P devices. The processor 1320 may be configured to be connected functionally to the transmitter 1311 and the receiver 1312 and thus control signal transmission and reception of the transmitter 1311 and the receiver 1312 to and from other P2P devices.

The processor 1320 may subject a transmission signal to many processes and then transmit the processed signal to the transmitter 1311. The processor 1320 may also process a signal received at the receiver 1312. When needed, the processor 1320 may store information included in an exchanged message in the memory 1330.

The P2P device 1300 having the above-described configuration may implement the afore-described various embodiments of the present invention. For example, if the P2P device 1300 performs the methods described with reference to FIGS. 5 to 12, each signal and/or message may be transmitted/received using the transmitter and/or the receiver of the RF unit and each operation may be performed under the control of the controller.

While not shown, the P2P device 1300 may further include various components according to its device application type. For example, if the P2P device 1300 is for smart metering, the P2P device 1300 may include additional components for power measurement, etc. The power measurement operation may be controlled by the processor 1320 illustrated in FIG. 8 or a separately configured controller (not shown).

While FIG. 13 illustrates a case where communication is conducted between one or more P2P devices, P2P communication may be conducted between the P2P device 1300 and an eNB. Herein, the devices may have the same configurations as illustrated in FIG. 13 and perform the methods according to the various embodiments of the present invention.

For example, the second device 1350 may be an eNB. Then the transmitter 1361 and the receiver 1362 of the eNB are configured to transmit and receive signals to and from another eNB, a P2P server, and P2P devices. The processor 1370 may be configured to be connected functionally to the transmitter 1361 and the receiver 1362 and thus control signal transmission and reception of the transmitter 1361 and the receiver 1362 to and from other devices. The processor 1370 may subject a transmission signal to many processes and then transmit the processed signal to the transmitter 1361. The processor 1370 may also process a signal received at the receiver 1362. When needed, the processor 1370 may store information included in an exchanged message in the memory 1330. The eNB 1350 having the above-described configuration may implement the afore-described various embodiments of the present invention.

In FIG. 13, the processors 1320 and 1370 of the first and second devices 1310 and 1350 instruct (e.g., control, adjust, and manage) the operations of the first and second devices 1310 and 1350, respectively. The processors 1320 and 1370 may be connected to the memories 1330 and 1380 that store program codes and data. The memories 1330 and 1380 are connected to the processors 1320 and 1370 and store an Operating System (OS), an application, and general files.

The processors 1320 and 1370 of the present invention may be referred to as controllers, microcontrollers, microprocessors, microcomputers, etc. The processors 1320 and 1370 may be achieved by hardware, firmware, software, or a combination thereof. In a hardware configuration, the processors 1320 and 1370 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to implement the present invention.

In a firmware or software configuration, firmware or software may be implemented in the form of a module, a procedure, a function, etc. performing the above-described functions or operations of the present invention. The firmware or software achieved to implement the present invention may be included in the processors 1320 and 1370 or stored in the memories 1330 and 1380 and executed by the processors 1320 and 1370.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for retransmitting data in a wireless access system supporting Machine to Machine (M2M) communication, the method performed by a first device and comprising:
    transmitting data to a second device;
    transmitting a transmission request message to the second device for re-transmission of the data when a NACK signal for the data transmission is received or there is no response to the data transmission;
    receiving a transmission response message from the second device in response to the transmission request message;
    monitoring transmission request messages or transmission response messages transmitted by other devices to obtain information related to whether there is contention in a first data slot for re-transmission of the data;
    determining whether priority of re-transmission of the data by the first device in the first data slot to be retransmitted is higher than priorities of transmission of data by the other devices when there is contention in the first data slot; and
    re-transmitting the data to the second device in the first data slot if the priority of re-transmission of the data by the first device in the first data slot is higher than priorities of transmission of data by the other devices when there is contention in the first data slot,
    wherein the data is not re-transmitted in the first data slot if the priority of re-transmission of the data by the first device in the first data slot is not higher than the priorities of transmission of data by the other devices and the first data slot does not belong to a predetermined window when there is contention in the first data slot, and
    wherein the data is re-transmitted in the first data slot if the first data slot belongs to the predetermined window even though the priority of re-transmission of the data by the first device is not higher than the priorities of transmission of data by the other devices when there is contention in the first data slot.

2. The method according to claim 1, wherein the first data slot is allocated based on a priority level of the first device.

3. The method according to claim 2, wherein the first data slot is a previously allocated data slot.

4. The method according to claim 3, further comprising transmitting a corresponding transmission request message to the second device in each of a plurality of data slots in order to allocate resources for data transmission in each of the plurality of data slots.

5. The method according to claim 3, further comprising transmitting a corresponding transmission request message to the second device in each of a plurality of data slots based on a predetermined peer device group in order to allocate resources for data transmission in each of the plurality of data slots.

6. A first device for retransmitting data in a wireless access system supporting Machine to Machine (M2M) communication, the first device comprising:
a Radio Frequency (RF) module for transmitting and receiving signals; and
a processor for:
controlling the RF module to transmit data to a second device,
controlling the RF module to transmit a transmission request message to the second device for re-transmission of the data when a NACK signal for the data transmission is received or there is no response to the data transmission;
controlling the RF module to receive a transmission response message from the second device in response to the transmission request message;
monitoring transmission request messages or transmission response messages transmitted by other devices to obtain information related to whether there is contention in a first data slot for re-transmission of the data;
determining whether priority of re-transmission of the data by the first device in the first data slot is higher than priorities of transmission of data by the other devices when there is contention in the first data slot; and
controlling the RF module to re-transmit the data to the second device in the first data slot if the priority of re-transmission of the data by the first device in the first data slot is higher than the priorities of transmission of data by the other devices when there is contention in the first data slot,
wherein the data is not re-transmitted in the first data slot if the priority of re-transmission of the data by the first device in the first data slot is not higher than the priorities of transmission of data by the other devices and the first data slot does not belong to a predetermined window when there is contention in the first data slot, and
wherein the data is re-transmitted in the first data slot if the first data slot belongs to the predetermined window even though the priority of re-transmission of the data by the first device is not higher than the priorities of transmission of data by the other devices when there is contention in the first data slot.

7. The first device according to claim 6, wherein the first data slot is allocated based on a priority level of the first device.

8. The first device according to claim 7, wherein the first data slot is a previously allocated data slot.

9. The first device according to claim 8, wherein the processor is further for controlling the RF to transmit a corresponding transmission request message to the second device in each of a plurality of data slots in order to allocate resources for data transmission in each of the plurality of data slots.

10. The first device according to claim 8, wherein the processor is further for controlling the RF using to transmit a corresponding transmission request message to the second device in each of a plurality of data slots based on a predetermined peer device group in order to allocate resources for data transmission in each of the plurality of data slots.

* * * * *